June 11, 1940. J. W. LOUGHEED 2,204,185
GANG HOOK BOAT
Filed Jan. 23, 1939
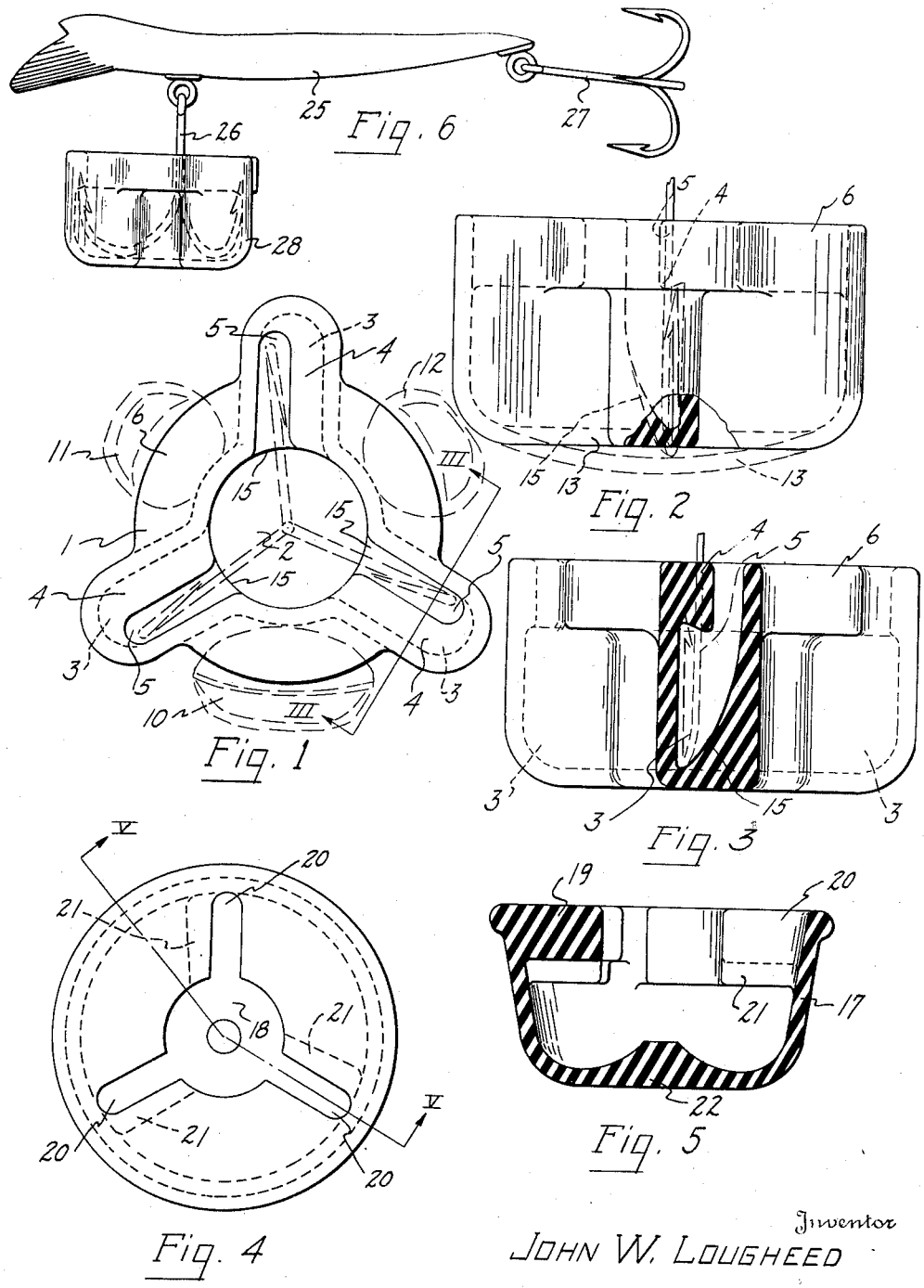
Inventor
JOHN W. LOUGHEED
By Beaman & Langford
Attorneys Patented June 11, 1940

2,204,185

UNITED STATES PATENT OFFICE 2,204,185

GANG HOOK BOOT

John W. Lougheed, Jackson, Mich.

Application January 23, 1939, Serial No. 252,249

6 Claims. (Cl. 43—39)

This invention relates to guards for fishhooks, and more particularly to boots for guarding the points of gang fishhooks.

A great many artificial fishing baits, particularly of the plug type, are provided with gang hooks, usually consisting of three individual hooks having a single shank and being arranged at 120° to each other. The common fisherman's expediency of sticking the point of a fishhook into a cork to protect it and to prevent it from doing damage fails as the practical solution in the case of gang hooks because of the many corks required. For instance, a single plug having two usual gang hooks would require six corks. The present invention contemplates the provision of a boot to guard the points of gang hooks, the boot being constructed preferably of molded rubber and having individual recesses for each separate hook of a gang, provided with restricted inlets and guarding sections for the points.

An object of the invention is to provide a boot for gang hooks.

Another object of the invention is to provide a hook boot having a recess provided with a restricted opening, into which a hook is projected.

A further object of the invention is to provide a hook boot having a recess provided with overhanging structure for guarding and receiving the point or points of the hook.

A still further object of the invention is to provide a hook boot wherein the point or points of the hook are resiliently retained embedded in a guarding structure.

These and other objects will be apparent from the following specification when taken with the accompanying drawing, in which Fig. 1 is a plan view of one portion of the invention, Fig. 2 is an elevation of the form of the invention disclosed in Fig. 1, illustrating the extension of the bottom in dotted outline during the positioning of a hook in the boot, Fig. 3 is a section on the line III—III of Fig. 1, Fig. 4 is a plan view of another form of the invention, Fig. 5 is a section on the line V—V of Fig. 4, and Fig. 6 is an elevation of an artificial fishing bait having one of the gang hooks thereof equipped with the boot hook according to the present invention.

Referring particularly to the drawing, the reference character 1 indicates a body preferably formed of molded rubber or its equivalent. The body is provided with a hollow central portion 2, from which substantially radially project recesses 3. There are as many recesses 3 as there are individual hooks in the gang hook to be booted. As shown, the number is three. Each recess 3 is provided over the upper portion thereof with an overhanging integral portion 4, which has the effect of providing a restricted opening 5 to each recess 3. The upper portion of the boot, as disclosed in Figs. 1, 2 and 3, is provided with a flange 6 for the purpose of making the structure more rigid. It will be understood, however, that the entire structure, including the flange 6, is made out of a single integral molded piece.

As shown particularly in Fig. 1, the boot is held by a thumb 10 and fingers 11 and 12. A gang hook having three individual hooks is then passed through the restricted openings 5 to the recesses 3, as shown in dotted outline in Fig. 1. As shown in dotted outline in Fig. 2, the gang hook is then pushed downwardly to extend the bottom 13 of the boot to the dotted position in order to permit the point of the hook shown in dotted outline to move beneath the overhanging portion 4. When downward pressure on the hook is released, the inherent resiliency of the boot, including its bottom 13, forces the hook upwardly so that its point is inserted in the overhanging portion 4, as disclosed particularly in Fig. 3.

The bottom of each recess 3 is provided with a camming portion 15, which serves, as a hook is pushed downwardly into the boot to cam the gang hook, circumferentially to move each of its points beneath an overhanging portion 4. Thus, while a slight manually induced relative rotary motion between the hook and the boot while the hook is being inserted into the boot will be of assistance in moving the points under the overhanging portions 4, this relative rotary movement will be automatically provided by the camming portion 15.

Another form of the invention is disclosed in Figs. 4 and 5. In this form the boot comprises a body 17 having a central opening 18 in the top thereof through a thickened top portion 19. Projecting substantially radially from the central opening 18 are restricted slots 20 corresponding to the restricted openings 5 of the recesses of the boot of the invention disclosed in Fig. 1. Depending downwardly from the top portion 19 are as many wall members 21 as there are restricted openings 20. Each wall member 21 is disposed adjacent one side of a slot 20, as shown particularly in Fig. 5, to provide a continuation of the walls, respectively, of the wall members 21.

A three-pointed gang hook is disposed in the boot disclosed in Figs. 4 and 5 in the same manner as it is disposed in the boot disclosed in Figs. 1, 2 and 3 of the drawing, the only difference being that a relative rotation between the boot and the hook must be provided manually in order to move the points of the hook beneath the overhanging portions of the top 19. The purpose of the wall portions 21 is to limit the relative rotation of the boot and the hook when the hook is disposed in the boot and also to limit the relative rotation of the boot when the hook is removed from the boot. Thus, on removing a gang hook from the boot disclosed in Figs. 4 and 5, the points of the hook are moved until they abut against the wall portions 21 to align the individual hooks with the slots 20 so that the individual hooks may be readily withdrawn from the boot. It will be understood that in this form of the invention the bottom portion 22 of the body 17 is extended downwardly at the time the gang hook is placed in the boot in order to permit the points of the hook to clear the top portion 19. Once the relative rotation between the hook and the boot has taken place and pressure of the gang hook against the bottom 22 is removed, the resiliency of the bottom 22 and of the body 17 as a whole will force the points of the hooks upward into the top portion 19.

In Fig. 6 is disclosed an artificial bait 25 provided with gang hooks 26 and 27. As shown, the gang hook 26 is provided with a boot 28 according to the present invention. Fig. 6 discloses the manner in which the points of the hooks are embedded in the body of the boot itself, a feature which not only securely retains the boot on the hook but also protects the points of the hook from moisture, and thus damage by rusting. As may be readily seen, an artificial bait having gang hooks may be quickly and safely shielded by applying boots according to the present invention. While the invention has been disclosed as applying to gang hooks, it will be evident that it is not so limited and that boots for single hooks may be constructed if desired.

Having thus described my invention, what I desire to secure by Letters Patent and claim is:

1. A gang hook boot, comprising a body having a cavity for receiving the gang hook to be booted, relatively soft structure overhanging said cavity for providing a guard for receiving in embedded relation the hook points of the hook in the gang, and resilient means for holding said points in said guarding structure.

2. A gang hook boot, comprising a body having a plurality of recesses therein, corresponding in number to the number of separate hooks in the gang hook to be booted, and structure secured to said body overhanging each recess to provide guards for the hook points and restricted openings into said recesses, respectively.

3. A gang hook boot, comprising a body of molded rubber having a plurality of recesses therein, corresponding in number to the number of separate hooks in the gang hook to be booted, and integral molded body structure overhanging said recesses to provide guards for the hook points and restricted openings into said recesses, respectively.

4. A gang hook boot, comprising a body having a plurality of recesses therein, corresponding in number to the number of separate hooks in the gang hook to be booted, structure secured to said body overhanging each recess to provide guards for the hook points and restricted openings into said recesses, respectively, and camming means disposed at the bottom of each recess for camming a hook projected thereinto laterally into a position beneath said overhanging structure.

5. A gang hook boot, comprising a body having a chamber therein, a central opening in one side of said chamber, a plurality of relatively narrow slots projecting outwardly from said central opening for permitting the movement of a gang hook into said cavity, whereby upon relative rotational movement between the boot and a gang hook in said cavity a portion of the slotted wall will overhang the points of the hook to guard the same, and means within said chamber for limiting the relative rotational movement between the boot and a gang hook therein.

6. The invention defined in claim 5, wherein the means limiting the rotational movement between the boot and a gang hook therein is disposed adjacent one side of each of said slots for aligning the individual hooks of the gang with said slot for facilitating the removal of the gang hook from the boot.

JOHN W. LOUGHEED.